United States Patent [19]
Yamada et al.

[11] Patent Number: 5,491,183
[45] Date of Patent: Feb. 13, 1996

[54] CATHODIC ELECTRODEPOSITION PAINT FORMING FILMS HAVING IMPROVED SURFACE SMOOTHNESS

[75] Inventors: Mitsuo Yamada, Suita; Ichiro Kawakami; Hiroyuki Nojiri, both of Takatsuki; Toshiyuki Ishii, Neyagawa, all of Japan

[73] Assignee: Nippon Paint Co., Ltd., Osaka, Japan

[21] Appl. No.: 336,117

[22] Filed: Nov. 4, 1994

[30] Foreign Application Priority Data

Nov. 5, 1993 [JP] Japan .................................. 5-301124
Nov. 5, 1993 [JP] Japan .................................. 5-301125

[51] Int. Cl.$^6$ .............................. C08K 3/20; C08L 63/02; C08L 63/04
[52] U.S. Cl. ...................... 523/404; 204/504; 523/410; 524/901
[58] Field of Search ........................ 523/404, 410; 204/181.7; 524/901

[56] References Cited

U.S. PATENT DOCUMENTS 4,192,929  3/1980  Wingfield, Jr. ........................ 523/404
4,738,995  4/1988  Kooijmans et al. .................... 523/404

*Primary Examiner*—Melvyn I. Marquis
*Assistant Examiner*—D. Aylward
*Attorney, Agent, or Firm*—Millen, White, Zelano & Branigan

[57] ABSTRACT

A cathodic electrodeposition paint containing a cationically modified epoxy resin and a crosslinker dispersed in an acidic aqueous medium is disclosed which contains an auxiliary resin component which is capable of improving the surface smoothness of the cured paint films and which is a reaction product produced by reacting a t-alkylphenol novolac epoxy resin with an amount of an active hydrogen compound sufficient to open all epoxy rings. When the thus produced auxiliary resin has a hydroxyl group, reaction thereof with a lactone or alkylene oxide, to graft a soft segment to the auxiliary resin improves not only the surface smoothness but also the impact strength of the paint films.

22 Claims, No Drawings

CATHODIC ELECTRODEPOSITION PAINT FORMING FILMS HAVING IMPROVED SURFACE SMOOTHNESS

BACKGROUND OF THE INVENTION

This invention relates to a cathodic electrodeposition paint forming films having improved surface smoothness. It also related to a cathodic electrodeposition paint forming films having improved surface smoothness and improved impact strength.

Amine-modified epoxy resins used as a film-forming cationic resin in cationic electrodeposition paints are known in the art, for example, in JP-A-54004978 and JP-A-56034186. These amine-modified epoxy resins are produced by reacting a bisphenol type epoxy resin with a primary or secondary amine to open all epoxy rings with the amine, or by reacting the epoxy resin first with a hydroxyl or carboxyl group-containing compound such as monophenols, monocarboxylic acids, hydroxycarboxylic acids, polycaprolactone diols or polyether diols to open a portion of epoxy rings and then with a primary or secondary amine to open the remaining epoxy rings. The resultant amine-modified epoxy resins are dispersed in an aqueous medium containing a neutralizing acid together with a crosslinker such as blocked polyisocyanates or melamine resin. Self-crosslinkable, amine-modified epoxy resins may be produced by reacting a bisphenol type epoxy resin with a half blocked diisocyanate to bind the diisocyanate through a secondary alcoholic group present in the resin molecule and then with a primary or secondary amine to open all terminal epoxy rings.

Cathodic electrodeposition paints derived from the above amine-modified epoxy resins have a defect, i.e., their wet films are susceptible to tiny craters induced by oil droplets or other particulate matters during the baking step resulting in cured films with impaired surface smoothness. Several methods are known to solve this problem including the addition of silicone anti-repellents or adducts of epoxy resin and polyoxypropylene diamine to the paint formulation. These additives, however, tend to decrease the adhesion of the paint film to a middle or top coating layer directly applied thereon.

A need exists for a cathodic electrodeposition paint which may produce a cured film having improved surface smoothness without imparing other film properties including adhesion to an overcoating layer.

SUMMARY OF THE INVENTION

The present invention provides a cathodic electrodeposition paint which may produce a cured film having improved surface smoothness. The paint comprises a primary cationic film-forming resin and an auxiliary film-forming resin capable of improving the surface smoothness of the cured films, and a crosslinker, all dispersed in an aqueous medium containing a neutralizing acid.

In one aspect of the present invention, the auxiliary resin is a reaction product produced by reacting a t-alkylphenol novolac epoxy resin with an amount of a cationic active hydrogen compound or a non-cationic active compound sufficient to open all epoxy rings, or by reacting the epoxy resin first with an amount of said non-cationic active hydrogen compound sufficient to open only a portion of the epoxy rings and then with an amount of said cationic active hydrogen compound sufficient to open the remaining epoxy rings.

In another aspect of the present invention, the auxiliary resin is a reaction product produced by reacting a t-alkylphenol novolac epoxy resin first with an amount of an active hydrogen reactant capable of introducing both a cationic group and a hydroxyl group sufficient to open all epoxy rings, and then with a lactone or alkylene oxide for grafting a soft segment to the hydroxyl group introduced to the resin molecule. The active hydrogen reactant may be a single compound capable of introducing both cationic and hydroxyl groups, or it may be a mixture of two active hydrogen compounds each capable of introducing a cationic group and a hydroxyl group, respectively. The auxiliary resin of this type can improve not only the surface smoothness but also the impact strength of cured paint films.

DETAILED DESCRIPTION OF THE INVENTION

Auxiliary Resin

Novolac epoxy resins in general are produced by reacting a novolac resin with epichlorohydrin in the presence of an alkali. Novolac resins, in turn, are an acid catalyzed polycondensation product of a phenol and formaldehyde. The starting novolac epoxy resins used in the present invention are derived from a phenol having a t-alkyl group such as t-butyl, t-amyl or t-octyl normally at the para position.

Novolac epoxy resins derived from p-t-butyl phenol, p-t-amylphenol, p-t-octylphenol or mixtures thereof are commercially available from, for example, Toto Kasei Co., Ltd.

One type of the auxiliary resins used in the present invention may be produced by opening all epoxy rings of the resin through a reaction with either a cationic active hydrogen compound or a non-cationic active hydrogen compound, or by reacting the resin first with the non-cationic active hydrogen compound to open a portion of epoxy rings and then with the cationic active hydrogen compound to open the remaining epoxy rings.

Cationic active hydrogen compounds capable of introducing a cationic group are well-known in the art and include primary amines such as butylamine, octylamine or monoethanolamine; secondary amines such as diethylamine, dibutylamine, methylbutylamine, diethanolamine or methylethanolamine; tertiary amine-acid addition salts such as triethylamine hydrochloride or N,N-dimethylethanolamine acetate; disulfide-acid mixtures such as diethylsulfideacetic acid mixture. Ketimines of a primary amine such as aminoethylethanolamine or diethylenetriamine may also be used. These amines and ketimines may be used singly or in combination.

Non-cationic active hydrogen compounds are also well-known in the art and include monophenols such as phenol, cresol, nonylphenol or nitrophenol; monoalcohols such as hexanol, 2-ethylhexanol, stearyl alcohol, ethylene glycol monobutyl or monohexyl ether, propylene glycol monobutyl or monohexyl ether; aliphatic monocarboxylic acids such as acetic or stearic acid; aliphatic hydroxycarboxylic acids such as glycolic, dimethylolpropionic, hydroxypivalic, lactic or citric acid; and mercaptoalkanols such as mercaptoethanol.

The proportion of active hydrogen compound relative to the epoxy resin is preferably such that the active hydrogen atom content is equivalent to or slightly excess of each epoxy group.

Another type of the auxiliary resin used in the present invention may be produced in at least two steps. Firstly, the starting epoxy resin is modified to have a cationic group and a hydroxyl group by the reaction first with an amount of a non-cationic active compound capable of introducing a hydroxyl group sufficient to open only a portion of the epoxy rings and then with an amount of a cationic active hydrogen compound sufficient to open the remaining epoxy rings, or by the reaction with an amount of an active hydrogen compound capable of introducing both hydroxyl and cationic groups sufficient to open all epoxy rings. The cationic active hydrogen compound may be the same as above and include primary or secondary amines, tertiary amine-acid addition salts and sulfide-acid mixtures. The non-cationic active hydrogen compound must have, in this case, a hydroxyl group apart from the active hydrogen atom. Examples thereof include aliphatic hydroxycarboxylic acids such as glycolic, dimethylolpropionic, hydroxypivalic, lactic or citric acid. Examples of active hydrogen compounds capable of introducing both hydroxyl and cationic groups include alkanolamines and ketimines thereof referred to as above.

Although the modified epoxy resin thus produced may improve the surface smoothness satisfactorily, it may be further modified to have the ability of improving antifoaming and impact strength properties of the paint and paint films. This may be performed by reacting the above modified epoxy resin to which a hydroxyl group has been introduced with a lactone such as ε-caprolactone or δ-valerolactone, or an alkylene oxide such as ethylene oxide or propylene oxide for grafting a soft segment to the hydroxyl group. Addition polymerization reactions of lactones or alkylene oxides to an active hydrogen initiator in the presence of a catalyst are well-known in the art. The hydroxyl group-containing modified epoxy resin acts, in this case, an initiator. The catalyst is an organic tin compound such as dibutyltin oxide when reacting with a lactone, and an alkali such as potassium hydroxide when reacting with an alkylene oxide. Generally from 0.2 to 8.0 moles, preferably from 0.5 to 5.0 moles of a lactone or alkylene oxide may be added to each hydroxyl group in average.

Primary Cationic Resin

The primary cationic resin used in the electrodeposition paint of the present invention may be any of known amine-modified epoxy resins those disclosed in JP-A-54004978 and JP-A-56034186 cited supra. Typically, they may be produced by reacting a bisphenol type epoxy resin with a cationic active hydrogen compound alone or in combination with a non-cationic active hydrogen compound to open all epoxy rings with the active hydrogen compound. Examples of bisphenol type epoxy resins include bisphenol A epoxy resins such as EPIKOTE 828 having an epoxy equivalent weight of 180–190, EPIKOTE 1001 having an epoxy equivalent weight of 450–500, and EPIKOTE 1010 having an epoxy equivalent weight of 3,000–4,000; and bisphenol F epoxy resins such as EPIKOTE 807 having an epoxy equivalent weight of 170. These resins are available from Yuka Shell Epoxy Co., Ltd. These epoxy resins are modified to have a cation equivalent preferably from 0.3 to 4.0 meq/g. As stated before, the primary cationic resins as well as starting epoxy resins, active hydrogen compounds and reaction conditions for producing the primary resins are all well-known in the art. Therefore, further discussion thereof is not necessary.

Crosslinker

The primary and auxiliary resins may be crosslinked with a melamine resin or a blocked polyisocyanate.

Examples of melamine resins include methylolmelamine and its ethers with a lower alkanol such as methanol or butanol.

Blocked polyisocyanates may be produced by reaction an organic polyisocyanate with a stoichiometric amount of a blocking agent. Examples of organic polyisocyanates include aromatic, alicyclic or aliphatic polyisocyanates such as tolylenediisocyanate, xylylenediisocyanate, phenylenediisocyanate, diphenylmethanediisocyanate, bis(isocyanatomethyl) cyclohexane, tetramethylenediisocyanate, hexamethylenediisocyanate, methylenediisocyanate, isophoronediisocyanate, dimers or trimers of these diisocyanates, and isocyanate group-terminated urethane prepolymers produced by reacting an excess of an organic polyisocyanate compound with a low molecular weight polyfunctional active hydrogen compound such as ethylene glycol, propylene glycol, trimethylolpropane, hexanetriol or castor oil.

The blocking agent should be capable of reversibly blocking the free isocyanate group so that the blocked polyisocyanate is stable at ambient temperature but the free isocyanate function may be regenerated by the dissociation of the blocking agent when heating to a temperature above the dissociation temperature. Examples of blocking agents include phenols such as phenol, cresol, xylenol, chlorophenol or ethylphenol; lactams such as ε-caprolactam, δ-valorolactam, γ-butyrolactam, or β-propiolactam; activated methylene compounds such as ethyl acetoacetate or acetylacetone; alcohols such as methanol, ethanol, propanol, butanol, amyl alcohol, ethylene glycol monomethyl ether, ethylene glycol monoethyl ether, ethylene glycol monobutyl ether, diethylene glycol monomethyl ether, propylene glycol monomethyl ether, benzyl alcohol, methyl glycolate, butyl glycolate, diacetone alcohol, methyl lactate or ethyl lactate; oximes such as formaldoxime, acetaldoxime, acetoxime, methyl ethyl ketoxime, diacetyl monooxime or cyclohexanoxime; mercaptans such as butylmercaptan, hexylmercaptan, t-butylmercaptan, thiophenol, methylthiophenol or ethylthiophenol; amides such as acetamide or benzamide; imides such as succinimide or maleimide; amines such as xylidine, aniline, butylamine or dibutylamine; imidazoles such as imidazole or 2-ethylimidazole; and imines such as ethyleneimine or propyleneimine. Oximes such as methyl ethyl ketoxime are used to advantage by virtue of well balanced storage stability and curability of the paint.

Self-crosslinkable modified epoxy resins may be used wholly or partly as the primary resin and the crosslinker. The self-crosslinkable resin may be produced, as stated before, by reacting a bisphenol type epoxy resin first with a half blocked diisocyanate to bind the diisocyanate through a urethane linkage between a secondary alcoholic group present in the resin molecule and the free isocyanate group of half blocked diisocyanate, and then with a cationic active hydrogen compound to open all epoxy rings in the same manner as the primary cationic resin.

Electrodeposition Paint

The electrodeposition paint of the present invention may be prepared by dispersing the primary and auxiliary resins and the crosslinker in an aqueous medium containing a neutralizing acid. The auxiliary resin may be dispersed in the aqueous medium together with the primary resin and the crosslinker. Alternatively, an aqueous dispersion of the auxiliary resin may be blended to a dispersion of the primary resin and the crosslinker prepared separately. Examples of neutralizing acids include hydrochloric, nitric, phosphoric, formic, acetic and lactic acids.

The amount of crosslinker must be sufficient to give a rigid film through a crosslinking reaction with amino, hydroxyl or carboxyl group contained in the primary and auxiliary resins, and generally ranges from 5 to 50% by weight of the resins as solids. The amount of neutralizing acid is such that at least 20%, preferably 30 to 60% neutralization of the resins is achieved. The amount of auxiliary resin ranges from 0.05 to 30%, preferably from 0.5 to 20% by the aggregated weight of the primary resin and the crosslinker as solids. Paints containing blocked polyisocyanate crosslinker may contain from 0.1 to 5% by weight of the crosslinker of a catalyst such as dibutyltin dilaurate, dibutyltin oxide or other urethane-cleaving catalysts.

The paint formulation may contain a variety of conventional additives. Examples thereof include coloring pigments such as titanium dioxide, carbon black or ferric oxide; rustproof pigments such as basic lead silicate or aluminum phosphomolybdate; extender pigments such as kaolin, talc or clay; and other additives such as water-miscible organic solvents, surfactants, antioxidants, UV absorbers and the like.

The following examples are intended to illustrate the invention without limiting thereto. All parts and percents therein are by weight unless otherwise indicated.

Auxiliary Resins

EXAMPLE 1

A flask equipped with a stirrer, condenser, nitrogen gas tube, thermometer and drip funnel was charged with 311 parts of p-t-butylphenol novolac epoxy resin (product of Toto Kasei Co., Ltd. having an epoxy equivalent wt. of 311 and an average molecular weight Mn of 1160) and 96.2 parts of methyl isobutyl ketone (MIBK). The mixture was heated to 80° C. to make a solution and then cooled to 40° C. 74 parts of N-methylethanolamine were added dropwise to the flask with caution to exothermic reaction and allowed to react at 80° C. until no epoxy function was detected while tracing the reaction with IR spectrometry and the measurement of epoxy equivalent weight. A modified epoxy resin having a nonvolatile content of 80% was obtained.

EXAMPLE 2

A flask as used in Example 1 was charged with 330 parts of p-t-amylphenol novolac epoxy resin (product of Toto Kasei, Co., Ltd. having an epoxy equivalent wt. of 330 and an average molecular weight Mn of 1100) and 1252 parts of MIBK. The mixture was heated to 80° C. to make a solution. Then 134 parts of dimethylolpropionic acid were added to the flask. After raising the inner temperature to 120° C., 2.5 parts of dimethylbenzylamine were added. The mixture was allowed to react at 150° C. for 1 hour and then at 140° C. until no epoxy function was detected. A modified epoxy resin having a nonvolatile content of 80% was obtained.

EXAMPLE 3

A flask as used in Example 1 was charged with p-t-octylphenol novolac epoxy resin (product of Toto Kasei, Co., Ltd. having an epoxy equivalent wt. of 367 and an Mn of 1200) and 125 parts of MIBK. The mixture was heated to 80° C. to make a solution. Then 134 parts of dimethylolpropionic acid were added to the flask. After raising the internal temperature to 120° C., 2.5 parts of dimethylbenzylamine were added. The mixture was allowed to react at 150° C. for 1 hour and then at 140° C. until no epoxy function was detected. A modified epoxy resin having a nonvolatile content of 80% was obtained.

EXAMPLE 4

A flask as used in Example 1 was charged with p-t-alkylphenol novolac epoxy resin derived from a 1:1 mixture of p-t-butylphenol and p-t-octylphenol (product of Toto Kasei Co., Ltd. having an epoxy equivalent wt. of 325 and an Mn of 1200) and 114 parts of MIBK. The mixture was heated to 80° C. to make a solution. Then 134 parts of dimethylolpropionic acid were added to the flask. After raising the inner temperature to 120° C., 2.3 parts of dimethylbenzylamine were added. The mixture was allowed to react at 150° C. for 1 hour and then at 140° C. until no epoxy function was detected. A modified epoxy resin having a nonvolatile content of 80% was obtained.

EXAMPLE 5

A flask as used in Example 1 was charged with 311 parts of t-butylphenol novolac resin (product of Toto Kasei Co., Ltd. having an epoxy equivalent wt. of 311 and an Mn of 1160) and 96.2 parts of MIBK. The mixture was heated to 80° C. to make a solution. Then 103 parts of nonylphenol and 2.0 parts of dimethylbenzylamine were added to the flask. The mixture was heated to 130° C. for the reaction and then cooled to 60° C. To this were added 37 parts of N-methylethanolamine with caution to exothermic reaction and the mixture allowed to react at 100° C. until no epoxy function was detected. A modified epoxy resin having a nonvolatile content of 80% was obtained.

COMPARATIVE EXAMPLE 1

A flask as used in Example 1 was charged with 169 parts of unsubstituted phenol novolac epoxy resin (product of Toto Kasei Co., Ltd. having an epoxy equivalent wt. of 160 and an Mn of 440) and 60.8 parts of MIBK. The mixture was heated to 80° C. to make a solution and then cooled to 40° C. To this were added 74 parts of N-methylethanolamine with caution to exothermic reaction and the reaction continued at 80° C. until no epoxy function was detected. A modified epoxy resin for comparative purposes having a nonvolatile content of 80% was obtained.

COMPARATIVE EXAMPLE 2

A flask as used in Example 1 was charged with 389 parts of p-n-nonylphenol novolac epoxy resin (product of Toto Kasei Co., Ltd. having an epoxy equivalent wt. of 389 and an Mn of 1250) and 116 parts of MIBK. The mixture was heated to 80° C. to make a solution and then cooled to 40° C. To this were added 74 parts of N-methylethanolamine with caution to exothermic reaction and the reaction continued at 80° C. until no epoxy function was detected. A modified epoxy resin for comparative purposes having a nonvolatile content of 80% was obtained.

Primary Resin

EXAMPLE 6

A flask equipped with a stirrer, condenser, nitrogen gas tube, thermometer and drip funnel was charged with 285.0 parts of a bisphenol A epoxy resin having an epoxy equivalent weight of 475, 380 parts of a bisphenol A epoxy resin having an epoxy equivalent weight 950, 77.0 parts of p-nonylphenol and 82.4 parts of MIBK. The mixture was heated to make a solution. To this were added 3.0 parts of benzyldimethyl-amine and the mixture allowed to react at 150° C. until an epoxy equivalent wt. of 1140 was reached. After cooling, 19.2 parts of diethanolamine, 27.0 parts of N-methylethanolamine and 30.6 parts of aminoethylethanolamine methyl isobutyl ketimine (79% in MIBK) were added to the mixture. Then the mixture was heated at 110° C. for 2 hours to continue the reaction and diluted with MIBK to 80% nonvolatiles.

EXAMPLE 7

A flask as used in Example 6 was charged with 54.0 parts of tolylenediisocyanate (80:20 mixture of 2,4- and 2,6-isomers), 136 parts of MIBK and 0.5 parts dibutyltin dilaurate. To this were added dropwise 10.9 parts of methanol with stirring over 30 minutes. The inner temperature reached at 60° C. during this period. After continuing the reaction for additional 30 minutes, 54 parts of ethylene glycol mono-2-ethylhexyl ether were added dropwise over 1 hour. The reaction was further continued while keeping the inner temperature at 60°–65° C. until the absorption of isocyanato group disappeared in IR spectrometry. Thereafter 285.0 parts of a bisphenol F epoxy resin having an epoxy equivalent wt. of 475, 380 parts of a bisphenol F epoxy resin having an epoxy equivalent wt. of 950, and 0.62 parts of benzyldimethylamine were added to the flask. The mixture was then heated to 120° C. and allowed to react while distilling off methanol produced as a by-product until an epoxy equivalent wt. of 1120 was reached. After cooling, 29.1 parts of diethanolamine, 21.5 parts of N-methylethanolamine and 32.9 parts of aminoethylethanolamine ketimine (79% solution in MIBK) were added. The mixture was then allowed to react at 110° C. for 2 hours and diluted with MIBK to 80% nonvolatiles.

Crosslinker

EXAMPLE 8

A flask as used in Example 6 was charged with 199 parts of hexamethylenediisocyanate trimer (CORONATE HX, Nippon Polyurathane K.K.), 32 parts of MIBK and 0.1 parts of dibutyltin dilaurate. To this were added dropwise 87.0 parts of methyl ethyl ketoxime over 1 hour with stirring and nitrogen gas bubbling while keeping the inner temperature at 50° C. Thereafter the mixture was allowed to react at 70° C. until no absorption of isocyanato group was detected in the IR spectrometry.

Pigment Paste

EXAMPLE 9

A pigment paste was prepared by milling the following mixture in a sand grind mill to a particle size less than 10 microns.

| Ingredients | Parts |
| --- | --- |
| Pigment dispersing resin (product of Nippon Paint Co., Ltd., sulfonium type modified epoxy resin, 60 % solids) | 125.0 |
| Carbon black | 8.5 |
| Kaolin | 72.0 |
| Titanium dioxide | 345.0 |
| Aluminum phosphomolybdate | 75.0 |
| Deionized water | 400.0 |

Electrodeposition Paint

EXAMPLES 10–16 AND COMPARATIVE EXAMPLES 3–6

Various primary resins, auxiliary resins and crosslinker of the preceeding Examples were blended in proportions as solids shown in Table 1, and ethylene glycol mono-2-ethylhexyl ether was added in a proportion of 2% of total solids of the mixture. Then the mixture was mixed with an amount of glacial acetic acid to achieve 42.5% neutralization and then gradually diluted with deionized water to 36.0% solids while distilling off MIBK under vacuum.

2,000 parts of the resulting emulsion were mixed with 460 parts of pigment paste of Example 9 and then diluted with deionized water to 20% solids.

Paint films were prepared by applying electrically on a zinc phosphate-treated cold rolled steel plate to a dry film thickness of 20 microns, and baked at 160° C. for 10 minutes. The results of evaluation on these paint film are also shown in Table 1.

TABLE 1

| | Example | | | | | | |
| --- | --- | --- | --- | --- | --- | --- | --- |
| | 10 | 11 | 12 | 13 | 14 | 15 | 16 |
| Primary resin | Ex. 6 | Ex. 6 | Ex. 7 | Ex. 7 | Ex. 7 | Ex. 7 | Ex. 7 |
| (parts as solids) | 67 | 67 | 67 | 67 | 67 | 67 | 67 |
| Auxiliary resin | Ex. 1 | Ex. 2 | Ex. 3 | Ex. 4 | Ex. 5 | Ex. 3 | Ex. 1 |
| (parts as solids) | 3.0 | 3.0 | 3.0 | 3.0 | 3.0 | 0.5 | 15.0 |
| Crosslinker | | | | | | | |
| (parts as solids) | 30 | 30 | 30 | 30 | 30 | 30 | 30 |
| Craters[1] | Good | Good | Good | Good | Good | Good | Good |
| Surface smoothness[2] (Ra) | 0.28 | 0.25 | 0.22 | 0.29 | 0.21 | 0.23 | 0.33 |
| Overcoating adhesion[3] | 100/100 | 100/100 | 100/100 | 100/100 | 100/100 | 100/100 | 100/100 |
| Corrosion resistance[4] | Good | Good | Good | Good | Good | Good | Good |

| | Comparative Example | | | |
| --- | --- | --- | --- | --- |
| | 3 | 4 | 5 | 6 |
| Primary resin | Ex. 6 | Ex. 7 | Comp. Ex. 1 | Comp. Ex. 2 |
| (parts as solids) | 67 | 67 | 67 | 67 |
| Auxiliary resin | Not added | Not added | Ex. 6 | Ex. 7 |
| (parts as solids) | | | 5.0 | 5.0 |
| Crosslinker | | | | |
| (parts as solids) | 30 | 30 | 30 | 30 |
| Craters[1] | Fair | Fair | Bad | Fair |
| Surface smoothness[2] (Ra in micron) | 0.28 | 0.25 | 0.28 | 0.30 |
| Overcoating adhesion[3] | 100/100 | 100/100 | 100/100 | 100/100 |

TABLE 1-continued

| Corrosion resistance[4] | Good | Good | Bad | Good |
|---|---|---|---|---|

Evaluation Method

1) Craters:

Judgement was made according the number of craters in a unit area (100 cm$^2$).

Good: 0–3; Fair: 4–10; Bad$\geq$11

2) Surface smoothness:

Measurement was made using Surface Roughness Meter Model E-30A sold by Tokyo Seimitsu K.K.

3) Overcoating adhesion:

The electrodeposition paint film was overlaid with an alkyd overcoating paint by spraying the alkyd paint to a dry film thickness of 35 microns and baking at 140° C. for 30 minutes. Then the overcoating film was scratched, according to JIS K5400-1975 6.15, into 100 grid segments each being of size 1 mm×1 mm. Then a pressure sensitive adhesive tape was applied on the grid and stripped off rapidly. The evaluation was made by counting the number of grid segments which remained on the electrodeposition paint film.

4) Corrosion resistance:

The electrodeposition film was scratched with a knife edge in a cross reaching to the substrate, and subjected to a salt spray test according to JIS Z 2371. Judgement was made according to the following schedule.

Good: No change

Fair: Detectable blisters were found.

Bad: Blisters occurred in whole area.

Auxiliary Resins

EXAMPLE 17

A flask equipped with a stirrer, condeser, nitrogen gas tube, thermometer and drip funnel was charged with 311 parts of p-t-butylphenol novolac epoxy resin (product of Toto Kasei Co., Ltd. having an epoxy equivalent wt. of 311 and an average molecular weight Mn of 1160) and 96.2 parts of methyl isobutyl ketone (MIBK). The mixture was heated to 80° C. to make a solution and then cooled to 40° C. 74 parts of N-methyethanolmaine were added dropwise to the flask with caution to exothermic reaction and allowed to react at 80° C. until no epoxy function was detected while tracing the reaction with IR spectrometry and the measurement of epoxy equivalent weight.

Then, 114 parts of ε-caprolactone were added and heating was continued. When the inner temperature reached 120° C., 1.14 parts of dibutyltin oxide were added. The reaction was further continued at 140° C. until the absorption of ε-caprolactone at 690 cm$^{-1}$ disappeared in the IR spectrometry. After cooling, the reaction product was diluted with 29 parts of MIBK. A modified epoxy resin having 80.1% nonvolatiles was obtained.

EXAMPLE 18

Example 17 was followed except that the amounts of ε-caprolactone and dibutyltin oxide were changed to 228 parts and 2.28 parts, respectively. A modified epoxy resin having 80.2% nonvolatiles was obtained.

EXAMPLE 19

Example 17 was followed except that the amounts of ε-caprolactone and dibutyltin oxide were changed to 913 parts and 4.57 parts, respectively. A modified epoxy resin having 80.4% nonvolatiles was obtained.

EXAMPLE 20

A flask as used in Example 17 was charged with 330 parts of p-t-amylphenol novolac epoxy resin (product of Toto Kasei Co., Ltd. having an epoxy equivalent wt. of 330 and an Mn of 1100) and 125 parts of MIBK. The mixture was heated to 80° C. to make a solution. Then 134 parts of dimethylolpropionic acid were added to the flask. After raising the reaction temperature to 120° C., 2.5 parts of dimethylbenzylamine were added. The mixture was allowed to react at 150° C. for 1 hour and at 140° C. thereafter until no epoxy function was detected.

Then 228 parts of ε-caprolactone were added and heating was continued. When the reaction temperature reached 120° C., 2.28 parts of dibutyltin oxide were added. The reaction was further continued at 140° C. until the absorption of ε-caprolactone at 690 cm$^{-1}$ disappeared in the IR spectrometry. After cooling, the product was diluted with 57 parts of MIBK. A modified epoxy resin having 80.3% nonvolatiles was obtained.

EXAMPLE 21

Example 20 was followed except that 367 parts of a p-t-octylphenol novolac epoxy resin (product of Toto Kasei Co., Ltd. having an epoxy equivalent wt. of 367 and an Mn of 1200) were used as starting novolac epoxy resin. A modified epoxy resin having 80.6% nonvolatiles was obtained.

EXAMPLE 22

Example 20 was followed except that 325 parts of a p-t-alkylphenol novolac resin (product of Toto Kasei Co., Ltd. derived from a 1:1 mixture of p-t-butylphenol and p-t-octylphenol, having an epoxy equivalent wt. of 325 and an Mn of 1200). A modified epoxy resin having 80.1% nonvolatiles was obtained.

EXAMPLE 23

A flask as used in Example 17 was charged with p-t-octylphenol novolac epoxy resin (product of Toto Kasei, Co., Ltd. having an epoxy equivalent wt. of 367 and an Mn of 1200) and 125 parts of MIBK. The mixture was heated to 80° C. to make a solution. Then 134 parts of dimethylolpropionic acid were added to the flask. After raising the reaction temperature to 120° C., 2.5 parts of dimethylbenzylamine were added. The mixture was allowed to react at 150° C. for 1 hour and at 140° C. thereafter until no epoxy function was detected. Then, 114 parts of ε-caprolactone were added and heating was continued. When the inner temperature reached 120° C., 1.14 parts of dibutyltin oxide were added. The reaction was further continued at 140° C. until the absorption of ε-caprolactone at 690 cm$^{-1}$ disappeared in the IR spectrometry. After cooling, the product was diluted with 29 parts of MIBK. A modified epoxy resin having 80.4% nonvolatiles was obtained.

EXAMPLE 24

Example 23 was followed except that 311 parts of a p-t-butylphenol novolac epoxy resin (product of Toto Kasei Co;, Ltd. having an epoxy equivalent wt. of 311 and an Mn of 1160) and 200 parts of δ-valerolactone were used. A modified epoxy resin having 80.2% nonvolatiles was obtained.

EXAMPLE 25

A flask equipped with a stirrer, condenser, nitrogen gas tube, thermometer and drip funnel was charged with 100 parts of p-t-butylphenol novolac epoxy resin (product of Toto Kasei Co., Ltd. having an epoxy equivalent wt. of 311 and an average molecular weight Mn of 1160). The content was heated to 80° C. and then cooled to 40° C. 24 parts of N-methyethanolamine were added dropwise to the flask with caution to obtain an exothermic reaction and allowed to react at 80° C. until no epoxy function was detected while following the reaction with IR spectrometry and the measurement of epoxy equivalent weight.

Then, the reaction product was transferred to an autoclave to which 1.803 parts of potassium hydroxide were added as catalyst. Then, 58 parts of propylene oxide were introduced to the autoclave and allowed to react at 96° C. under pressure. After removing unreacted propylene oxide and potassium hydroxide, a modified epoxy resin having 97.2 nonvolatiles was obtained.

COMPARATIVE EXAMPLE 7

A flask as used in Example 17 was charged with 169 parts of unsubstituted phenol novolac epoxy resin (product of Toto Kasei Co., Ltd. having an epoxy equivalent wt. of 160 and an Mn of 440) and 60.8 parts of MIBK. The mixture was heated to 80° C. to make a solution and then cooled to 40° C. To this were added 74 parts of N-methylethanolamine with caution to obtain an exothermic reaction and the reaction continued at 80° C. until no epoxy function was detected.

Then, 114 parts of ε-caprolactone were added and heating was continued. When the inner temperature reached 120° C., 1.14 parts of dibutyltin oxide were added. The reaction was further continued at 140° C. until the absorption of ε-caprolactone at 690 $cm^{-1}$ disappeared in the IR spectrometry. After cooling, the reaction product was diluted with 29 parts of MIBK. A modified epoxy resin having 80.2% nonvolatiles was obtained.

COMPARATIVE EXAMPLE 8

A flask as used in Example 17 was charged with 389 parts of p-n-nonylphenol novolac epoxy resin (product of Toto Kasei Co., Ltd. having an epoxy equivalent wt. of 389 and an Mn of 1250) and 116 parts of MIBK. The mixture was heated to 80° C. to make a solution and then cooled to 40° C. To this were added 74 parts of N-methylethanolamine with caution to exothermic reaction and the reaction continued at 80° C. until no epoxy function was detected.

Then, 114 parts of ε-caprolactone were added and heating was continued. When the inner temperature reached 120° C., 1.14 parts of dibutyltin oxide were added. The reaction was further continued at 140° C. until the absorption of ε-caprolactone at 690 $cm^{-1}$ disappeared in the IR spectrometry. After cooling, the reaction product was diluted with 29 parts of MIBK. A modified epoxy resin having 80.5% nonvolatiles was obtained.

Electrodeposition Paint

EXAMPLES 26–37 AND COMPARATIVE EXAMPLES 9–12

Various primary resins, auxiliary resins and crosslinker of the preceeding Examples were blended in proportions as solids shown in Table 2, and ethylene glycol mono-2-ethylhexyl ether was added in a proportion of 2% of total solids of the mixture. Then the mixture was neutralized with glacial acetic acid to 42.5% neutralization and then gradually diluted with deionized water to 36.0% solids while distilling off MIBK under vacuum.

2,000 parts of the resulting emulsion were mixed with 460 parts of pigment paste of Example 9 and then diluted with deionized water to 20% solid.

Paint films were prepared by applying electrically on a zinc phosphate-treated cold rolled steel plate to a dry film thickness of 20 microns, and baked at 160° C. for 10 minutes. The results of evaluation on these paint film are also shown in Table 2.

TABLE 2

| | Example | | | | | | | |
|---|---|---|---|---|---|---|---|---|
| | 26 | 27 | 28 | 29 | 30 | 31 | 32 | 33 |
| Primary resin | Ex. 6 | Ex. 6 | Ex. 6 | Ex. 7 | Ex.7 | Ex. 7 | Ex. 7 | Ex. 6 |
| (parts as solids) | 67 | 67 | 67 | 67 | 67 | 67 | 67 | 67 |
| Auxiliary resin | Ex. 17 | Ex. 18 | Ex. 19 | Ex. 20 | Ex. 21 | Ex. 22 | Ex. 23 | Ex. 24 |
| (parts as solids) | 3.0 | 3.0 | 3.0 | 3.0 | 3.0 | 3.0 | 3.0 | 3.0 |
| Crosslinker | 30 | 30 | 30 | 30 | 30 | 30 | 30 | 30 |
| (parts as solids) | | | | | | | | |
| Craters[1] | Good | Good | Good | Good | Good | Good | Good | Good |
| Surface smoothness[2] | 0.25 | 0.22 | 0.20 | 0.20 | 0.21 | 0.23 | 0.30 | 0.28 |
| (Ra in micron) | | | | | | | | |
| Overcoating adhesion[3] | 100/100 | 100/100 | 100/100 | 100/100 | 100/100 | 100/100 | 100/100 | 100/100 |
| Corrosion resistance[4] | Good | Good | Good | Good | Good | Good | Good | Good |
| Antifoaming[5] | Good | Good | Good | Good | Good | Good | Good | Good |
| Impact strength[6] | Good | Good | Good | Good | Good | Good | Good | Good |
| (at- 5° C., | | | | | | | | |
| 500 g × 50 cm) | | | | | | | | |

TABLE 2-continued

|  | Example | | | | Comparative Example | | | |
| --- | --- | --- | --- | --- | --- | --- | --- | --- |
|  | 34 | 35 | 36 | 37 | 9 | 10 | 11 | 12 |
| Primary resin | Ex. 6 | Ex. 6 | Ex. 6 | Ex. 6 | Ex. 7 | Ex. 7 | Ex. 6 | Ex. 6 |
| (parts as solids) | 67 | 67 | 67 | 67 | 67 | 67 | 67 | 67 |
| Auxiliary resin | Ex. 25 | Ex. 17 | Ex. 17 | Ex. 17 | Comp. Ex. 7 | Comp. Ex. 8 | Not added | Not added |
| (parts as solids) | 3.0 | 0.5 | 10.0 | 25.0 | 3.0 | 3.0 |  |  |
| Crosslinker | 30 | 30 | 30 | 30 | 30 | 30 | 30 | 30 |
| (parts as solids) |  |  |  |  |  |  |  |  |
| Craters[1] | Good | Good | Good | Good | Fair | Fair | Fair | Fair |
| Surface smoothness[2] | 0.25 | 0.22 | 0.25 | 0.28 | 0.22 | 0.29 | 0.23 | 0.33 |
| (Ra in micron) |  |  |  |  |  |  |  |  |
| Overcoating adhesion[3] | 100/100 | 100/100 | 100/100 | 99/100 | 100/100 | 100/100 | 100/100 | 100/100 |
| Corrosion resistance[4] | Good | Good | Good | Good | Fair | Fair | Good | Good |
| Antifoaming[5] | Good | Good | Good | Good | Good | Good | Good | Good |
| Impact strength[6] | Good | Good | Good | Good | Good | Good | Good | Good |
| (at -5° C., |  |  |  |  |  |  |  |  |
| 500 g × 50 cm) |  |  |  |  |  |  |  |  |

Evaluation Method

1) Craters:

Judgement was made according the number of craters in a unit area (100 cm$^2$).

Good: 0–3; Fair: 4–10; Bad: ≧11

2) Surface smoothness:

Measurement was made using Surface Roughness Meter Model E-30A sold by Tokyo Seimitsu K.K.

3) Overcoating adhesion:

The electrodeposition paint film was overlaid with an alkyd overcoating paint by spraying the alkyd paint to a dry film thickness of 35 microns and baking at 140° C. for 30 minutes. Then the overcoating film was scratched, according to JIS K5400-1975 6.15, into 100 grid segments each being of size 1 mm×1 mm. Then a pressure sensitive adhesive tape was applied on the grid and stripped off rapidly. The evaluation was made by counting the number of grid segments remained on the electrodeposition paint film.

4) Corrosion resistance:

The electrodeposition film was scratched with a knife edge in a cross reaching to the substrate, and subjected to a salt spray test according to JIS Z 2371. Judgement was made according to the following schedule.

Good: No change

Fair: Detectable blisters were found.

Bad: Blisters occurred in whole area.

5) Antifoaming:

A 100 ml aliquot of paint was poured into a 500 ml graduated cylinder from a Ford cup placed to 100 cm height and the volume of foam was measured. The judgements was made according to the following schedule:

Good: 0–30 ml; Fair: 30–50 ml; Bad: >50 ml

6) Impact strength:

Ball dropping test (500 g×50 cm) at −5° C.

Good: No change; Fair: Partial peeling;

Bad: Remarkable peeling.

We claim:

1. In a cathodic electrodeposition paint composition comprising a primary cationically modified epoxy resin and a crosslinker dispersed in an aqueous medium containing a neutralizing acid, the improvement wherein Said epoxy resin is a bisphenol epoxy resin and wherein said paint comprises a cured film surface smoothness improving amount, from 0.5 to 30% of the combined weight of said primary resin and said cross-linker, of an auxiliary resin which is a reaction product produced either by reacting a t-alkylphenol novolac epoxy resin with an amount of a cationic active hydrogen compound or a non-cationic active compound sufficient to open all of the epoxy rings of said epoxy resin, or by first reacting said epoxy resin with an amount of said non-cationic active compound sufficient to open only a portion of said epoxy rings and then with an amount of said cationic active hydrogen compound sufficient to open the remaining epoxy rings.

2. The cathodic electrodeposition paint according to claim 1, wherein said t-alkylphenol is p-t-butylphenol, p-t-amylphenol, p-t-octylphenol or a mixture thereof.

3. The cathodic electrodeposition paint according to claim 1, wherein said cationic active hydrogen compound is a primary amine, a secondary amine, a tertiary amine acid addition salt or a disulfide-acid mixture.

4. The cathodic electrodeposition paint according to claim 1, wherein said non-cationic active hydrogen compound is a monophenol, a monoalcohol, an aliphatic monocarboxylic acid, an aliphatic hydroxycarboxylic acid or a mercaptoalkanol.

5. The cathodic electrodeposition paint according to claim 1, wherein the proportion of said auxiliary resin in said paint is from 0.05 to 20% of the combined weight of said primary resin and said crosslinker.

6. The cathodic electrodeposition paint according to claim 1, wherein said crosslinker is a melamine resin.

7. The cathodic electrodeposition paint according to claim 1, wherein said crosslinker is a blocked polyisocyanate.

8. In a cationic electrodeposition paint composition comprising a primary cationically modified epoxy resin and a crosslinker dispersed in an aqueous medium containing a neutralizing acid, the improvement wherein said epoxy resin is a bispphenol epoxy resin and wherein said paint comprises a cured film surface smoothness and impact strength improving amount, from 0.5 to 30% of the combined weight of said primary resin and said cross-linker of an auxiliary resin which is a reaction product produced by reacting a t-alkylphenol novolac epoxy resin first with an amount of an active hydrogen reactant capable of introducing a cationic group and a hydroxyl group sufficient to open all epoxy rings of said epoxy resin, and then with a lactone or alkylene oxide for grafting a soft segment to the hydroxyl group introduced to the resin molecule.

9. The cathodic electrodeposition paint according to claim 8, wherein said t-alkylphenol is p-t-butylphenol, p-t-amylphenol, p-t-octylphenol or a mixture thereof.

10. The cathodic electrodeposition paint according to claim 8, wherein said active hydrogen reactant is an alkanolamine or a ketimine thereof.

11. The cathodic electrodeposition paint according to claim 8, wherein said active hydrogen reactant is a combination of an active hydrogen compound capable of introducing a cationic group and an active hydrogen compound capable of introducing a hydroxyl group.

12. The cathodic electrodeposition paint according to claim 11, wherein said active hydrogen compound capable of introducing a cationic group is a primary amine, a secondary amine, a tertiary amine acid addition salt or a disulfide-acid mixture.

13. The cathodic electrodeposition paint according to claim 11, wherein said active hydrogen compound capable of introducing a hydroxyl group is an aliphatic hydroxycarboxylic acid.

14. The cathodic electrodeposition paint according to claim 8, wherein said lactone is ε-caprolactone or δ-valerolactone.

15. The cathodic electrodeposition paint according to claim 8, wherein said alkylene oxide is ethylene oxide or propylene oxide.

16. The cathodic electrodeposition paint according to claim 8, wherein from 0.5 to 5.0 moles of said lactone or alkylene oxide are added for each said hydroxyl group on average.

17. The cathodic electrodeposition paint according to claim 8, wherein the proportion of said auxiliary resin in said paint is from 0.05 to 20% of the combined weight of said primary resin and said crosslinker.

18. The cathodic electrodeposition paint according to claim 8, wherein said crosslinker is a melamine resin.

19. The cathodic electrodeposition paint according to claim 8, wherein said crosslinker is a blocked polyisocyanate.

20. A cationic electrodeposition paint according to claim 1, wherein said t-alkylphenol is p-t-butylphenol, p-t-amylphenol, p-t-octylphenol or a mixture thereof, wherein said cationic active hydrogen compound is a primary amine, a secondary amine, a tertiary amine acid addition salt or a disulfide-acid mixture, wherein said non-cationic active hydrogen compound is a monophenol, a monoalcohol, an aliphatic monocarboxylic acid, an aliphatic hydroxycarboxylic acid or a mercaptoalkanol, and wherein said crosslinked is a melamine resin.

21. A cationic electrodeposition paint according to claim 1, wherein said t-alkylphenol is p-t-butylphenol, p-t-amylphenol, p-t-octylphenol or a mixture thereof, wherein said cationic active hydrogen compound is a primary amine, a secondary amine, a tertiary amine acid addition salt or a disulfide-acid mixture, wherein said non-cationic active hydrogen compound is a monophenol, a monoalcohol, an aliphatic monocarboxylic acid, an aliphatic hydroxycarboxylic acid or a mercaptoalkanol, and wherein said crosslinked is a blocked polisocyanate.

22. A cathodic electrodeposition paint composition comprising a primary cationically modified epoxy resin and a crosslinker dispersed in an aqueous medium containing a neutralizing acid, wherein said paint comprises a cured film surface smoothness improving amount, from 0.5 to 30% of the combined weight of said primary resin and said crosslinker, of an auxiliary resin and wherein (A) said epoxy resin is a bisphenol epoxy resin and the auxiliary resin is a reaction product produced either (a) by reacting a t-alkylphenol novolac epoxy resin with an amount of a cationic active hydrogen compound or a non-cationic active compound sufficient to open all of the epoxy rings of said epoxy resin, or (b) by first reacting said novolac epoxy resin with an amount of said non-cationic active compound sufficient to open only a portion of said epoxy rings and then with an amount of said cationic active hydrogen compound sufficient to open the remaining epoxy rings, or (B) said auxiliary resin is produced by first reacting a t-alkylphenol novolac epoxy resin with an amount sufficient to open all of said epoxy rings of an active hydrogen reactant capable of introducing a cationic group and a hydroxy group and then with a lactone or alkylene oxide which introduces a lactone or alkyhlene oxide for grafting a soft segment to the hydroxyl group introduced into the resin molecule.

* * * * *